(12) United States Patent
Takemi

(10) Patent No.: US 6,969,175 B2
(45) Date of Patent: Nov. 29, 2005

(54) LAMP UNIT FOR IMAGE PROJECTOR

(75) Inventor: Kazutoshi Takemi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/849,029

(22) Filed: May 20, 2004

(65) Prior Publication Data
US 2004/0233397 A1 Nov. 25, 2004

(30) Foreign Application Priority Data
May 21, 2003 (JP) ............................. 2003-002883

(51) Int. Cl.[7] ....................... G03B 21/14; G03B 21/20; F21V 7/00
(52) U.S. Cl. ..................... 353/87; 353/119; 362/306
(58) Field of Search ..................... 353/87, 199, 122, 353/119; 362/306, 310, 368, 372

(56) References Cited

U.S. PATENT DOCUMENTS 3,848,982 A * 11/1974 Shoji et al. ............... 353/87
6,398,367 B1 * 6/2002 Watanabe ................ 353/119
6,575,606 B2 * 6/2003 Shaw ....................... 362/306
2004/0233400 A1 * 11/2004 Kyoto et al. ............. 353/119

FOREIGN PATENT DOCUMENTS

JP 49-105855 12/1947
JP 62-145898 6/1987

* cited by examiner

Primary Examiner—Christopher Mahoney
(74) Attorney, Agent, or Firm—Crowell & Moring LLP

(57) ABSTRACT

A lamp unit for an image projector comprises: a cable fixing portion comprising two posts and provided to stand inside a lamp box; and a cover plate mounted to contact upper ends of the posts and of the cable fixing portion. A cable for supplying electric power to a lamp body is inserted into the space between the posts, and wound around the posts. Thereby, even when a connector at an end of the cable is pulled, the cable is fixed and does not move, with the pulling force being not transferred to the lamp body. The cover plate mounted to contact the upper ends of the posts furthermore prevents the cable from slipping off the posts. Thus, with simple cable fixing structure, the lamp body can be prevented from slipping in position without increasing cost.

7 Claims, 5 Drawing Sheets

LAMP UNIT FOR IMAGE PROJECTOR

BACKGROUND OF THE INVENTION

1. Field of the Invention

The present invention relates to a lamp unit for and to be mounted in an image projector to project images onto a screen or the like.

2. Description of the Related Art

Conventionally, an image projector is known such that, based on image data from a personal computer, a video camera and the like, images are formed by an image forming element, and the formed images are projected onto a screen or the like. This kind of image projector comprises a lamp unit to project light and an image projection unit to project the images formed by the image forming unit, using the light from the lamp unit.

The lamp unit has such structure that a lamp body is held in a lamp box. The lamp unit is attachably and detachably mounted on a body of the image projector so as to make it possible to replace the lamp body when the lamp body becomes unusable due to its degradation, life or the like. The lamp body comprises a lamp bulb supplied with electric power for emitting light, and a reflector fixed integrally to this lamp bulb for reflecting and collecting the light. The reflector is made of glass or the like from the viewpoint of heat resistance and efficiency of reflection, so that the reflector may possibly get broken if fixed by machine screws or the like. Accordingly, in order to be held in the lamp box, the reflector is pressed against a holding portion in the lamp box by a biasing member such as spring. Further, a cable (electric cable) is connected to the lamp body for supplying electric power to the lamp body. This cable has, at an end thereof, a connector which is connected to the body of the image projector when mounting the lamp unit in the body of the image projector.

Now, according to such lamp unit, the reflector is held in the lamp unit in a manner that the reflector within the lamp box is pressed against the lamp box by the biasing member. Accordingly, in the case where the cable is pulled at the time, e.g., of replacing the lamp, there is a possibility that the position of the lamp body may slip. If the position of the lamp body slips, the utilization efficiency of light from the lamp body decreases, and hence the images projected by the body of the image projector become dark. It is to be noted that even in the case where the reflector is made of metal, and is fixed by e.g. machine screws, there is a possibility that the position of the lamp body may slip if the cable is strongly pulled.

Thus, it is known to provide, in the lamp box of the lamp unit, a member for restricting the movement of the connector at the end of the cable, thereby preventing the cable from being pulled. In such lamp unit, the connector is slidably held by a rail provided in the lamp box, and can be connected to the body of the image projector by being slided along the rail. According to such lamp unit, the connector is restricted from moving in directions other than the direction along the rail, whereby the cable is prevented from being pulled more than necessarily.

Meanwhile, in a fixing device for fixing an cable (power supply cord) connected to a power supply unit of e.g. a television receiver, it is known: to provide a boss and a rib in a recessed groove; to form loop portions of the cable; to twist the intersecting portions of the loop portions; to place the loop portions of the cable around the outer circumference of the boss; and to insert the twisted intersecting portions of the loop portions of the cable into the space between the recessed groove and the rib. (Refer to e.g. Japanese Laid-open Patent Publication Sho 62-145898.)

Furthermore, in a cable drawing device in electronic equipment, it is known: to insert a cable into a hook provided at an inner surface of a housing; and to wind the cable around a boss from lower to upper position of the boss, the boss being placed to stand facing the hook. (Refer to e.g. Japanese Laid-open Utility Model Publication Sho 49-105855.)

However, according to the above-described conventional lamp unit, a member for restricting the movement of the connector is provided in a lamp box. Such member for restricting the movement of the connector is complex in structure, and causes cost increase. On the other hand, according to the two prior art references, the cable fixing structures are complex, and further require complex work to fix the cables. If the technologies disclosed in these references were applied to a lamp unit, the cost of the lamp unit would increase due to the complex cable fixing structures.

SUMMARY OF THE INVENTION

An object of the present invention is to provide such lamp unit for an image projector that has a simple structure to fix a cable, and can prevent a lamp body from slipping in position without increasing cost.

For achieving the above-described object, an aspect of the present invention provides a lamp unit for an image projector having a projector body provided with a connector, the lamp unit comprising: a lamp body comprising a lamp bulb and a reflector; a lamp box being provided to hold the lamp body; and a cable, comprising a connector at an end thereof, for supplying electric power to the lamp body, wherein the lamp body receives electric power from the projector body by connecting the connector of the cable to the connector of the projector body, and wherein the lamp box comprises two posts placed therein with a small space therebetween, and the cable is fixed by being inserted into the space between the two posts and by being wound around the two posts.

According to the present invention, the cable for supplying electric power to the lamp body is fixed in a manner that the cable is inserted into the space between two posts of the cable fixing unit, and wound around the two posts. Thereby, the lamp body is prevented from slipping in position even when the connector at the end of the cable is pulled, because the pulling force is not transferred to the lamp body via the cable. Thus, in contrast to prior art, it is not necessary to use any member for restricting the movement of the connector, thereby realizing simple structure to fix the cable as well as cost reduction.

Preferably, a cover member is further mounted and contacted on upper ends of the posts of the cable fixing unit. Thereby, the cable is prevented from slipping off the posts, with the fixing state of the cable being maintained, even when the connector at the end of the cable is pulled. Thus, with simple structure, the lamp body can be prevented from slipping in position.

Preferably, the cover member further comprises a cable insertion opening to pass and draw the cable to outside the lamp box. Thereby, the cable is further prevented from slipping off the posts, with the fixing state of the cable being maintained, even when the connector at the end of the cable is pulled.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

An embodiment of the present invention will be described hereinafter with reference to the drawings.

Figure 1:
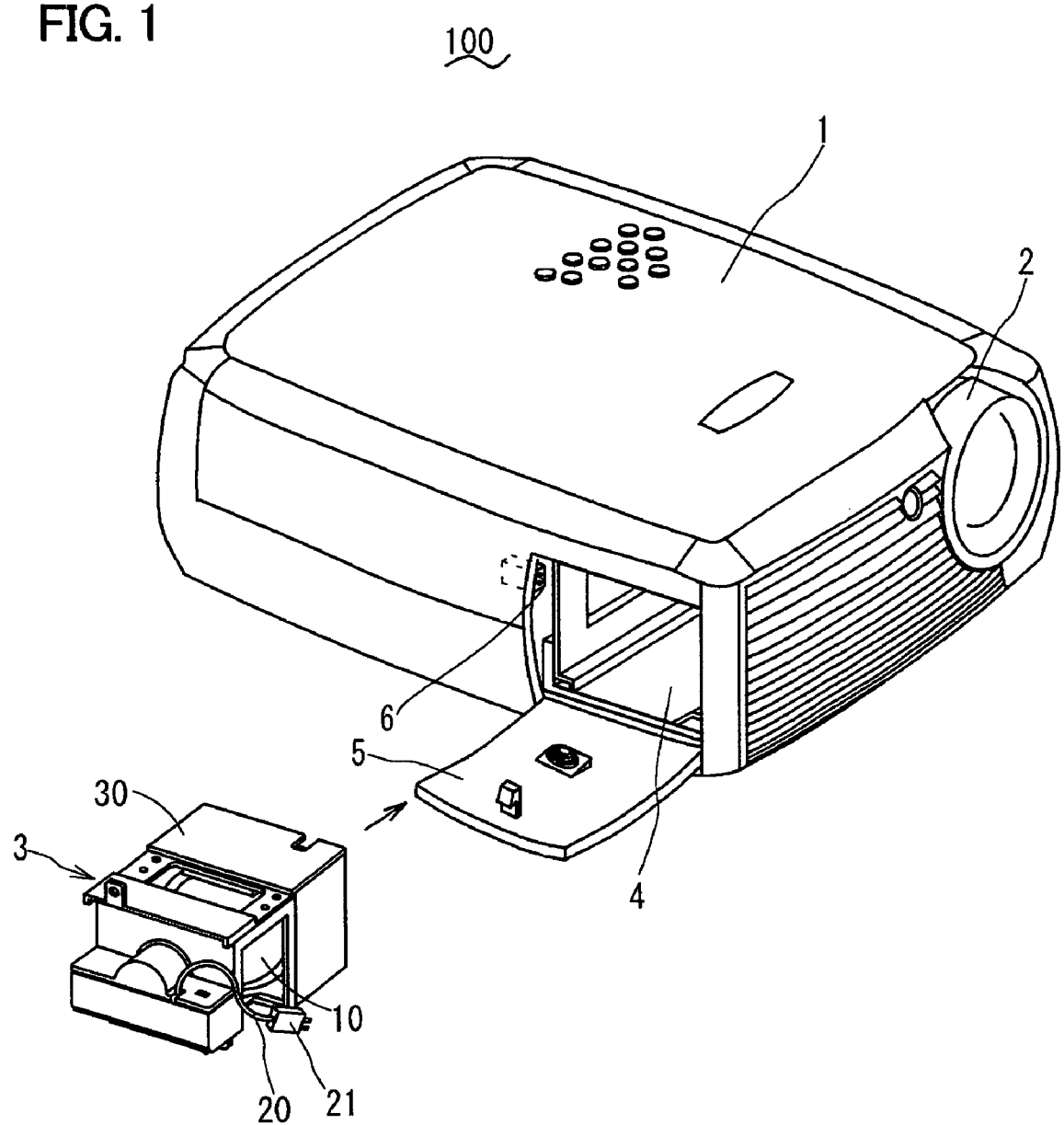
FIG. 1 is a schematic perspective view of an image projector having, applied thereto, a lamp unit according to an embodiment of the present invention.

Referring to FIG. 1, an image projector 100 is such equipment that, based on image signals input from a personal computer, a video camera and the like, images are formed by a built-in image forming element, and the formed images are projected onto a screen, a wall surface or the like for display. This image projector 100 comprises, at a front face of a projector body 1, a projector lens 2 for projecting images. The image projector 100 further comprises, inside the projector body 1, a lamp unit 3 to emit light for image projection, and an image projection unit (not shown) to project images, formed by the image forming element, from the projection lens 2 using the light from the lamp unit 3.

The projector body 1 has a structure such that the lamp unit 3 can be attached thereto and detached therefrom. The projector body 1 comprises: a lamp mounting space 4 to mount the lamp unit 3 in; a lamp door 5 to open and close the lamp mounting space 4; and a connector 6 to supply electric power to the lamp unit 3. The lamp unit 3 comprises a cable 20 to be supplied with electric power from the projector body 1. The cable 20 is inserted into the lamp mounting space 4, and thereafter a connector 21 at an end of the cable 20 is connected to a connector 6 at the projector body 1, and then the lamp door 5 is closed, whereby the cable 20 is installed.

Figure 2:
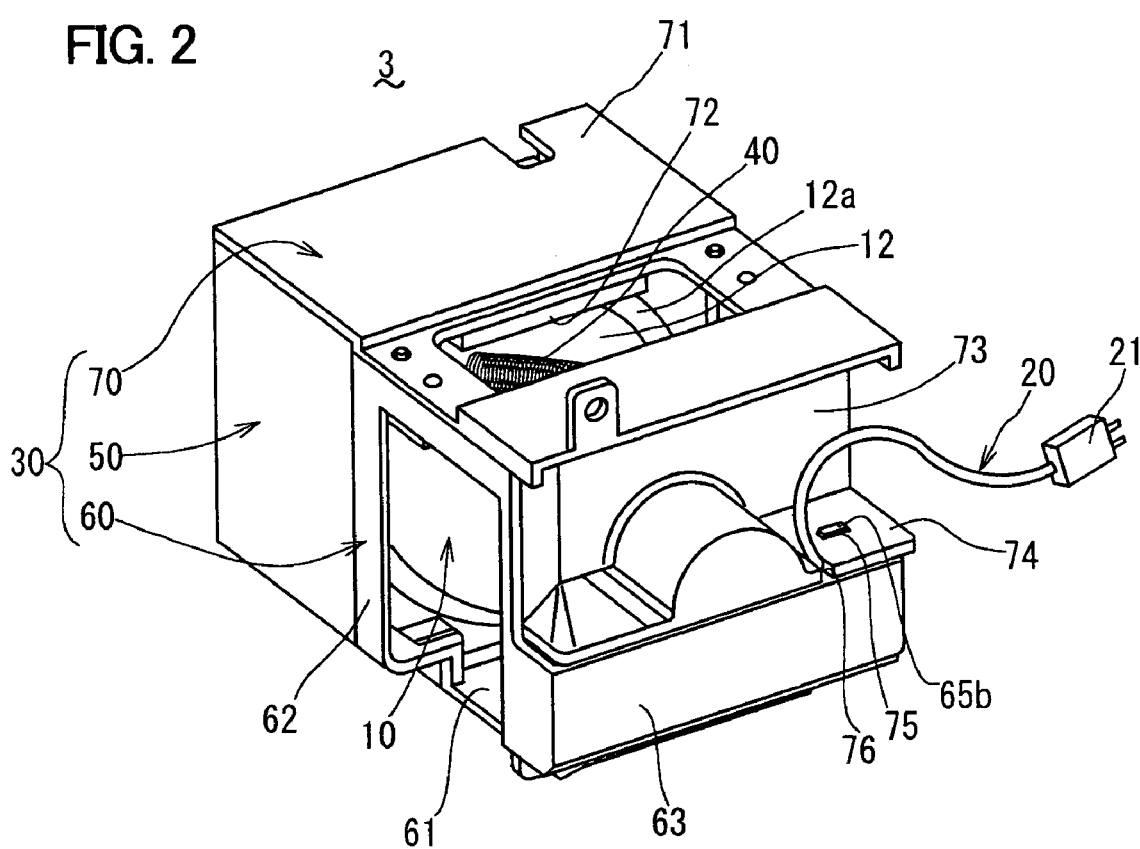
FIG. 2 is a schematic perspective view of the lamp unit.
Figure 3:
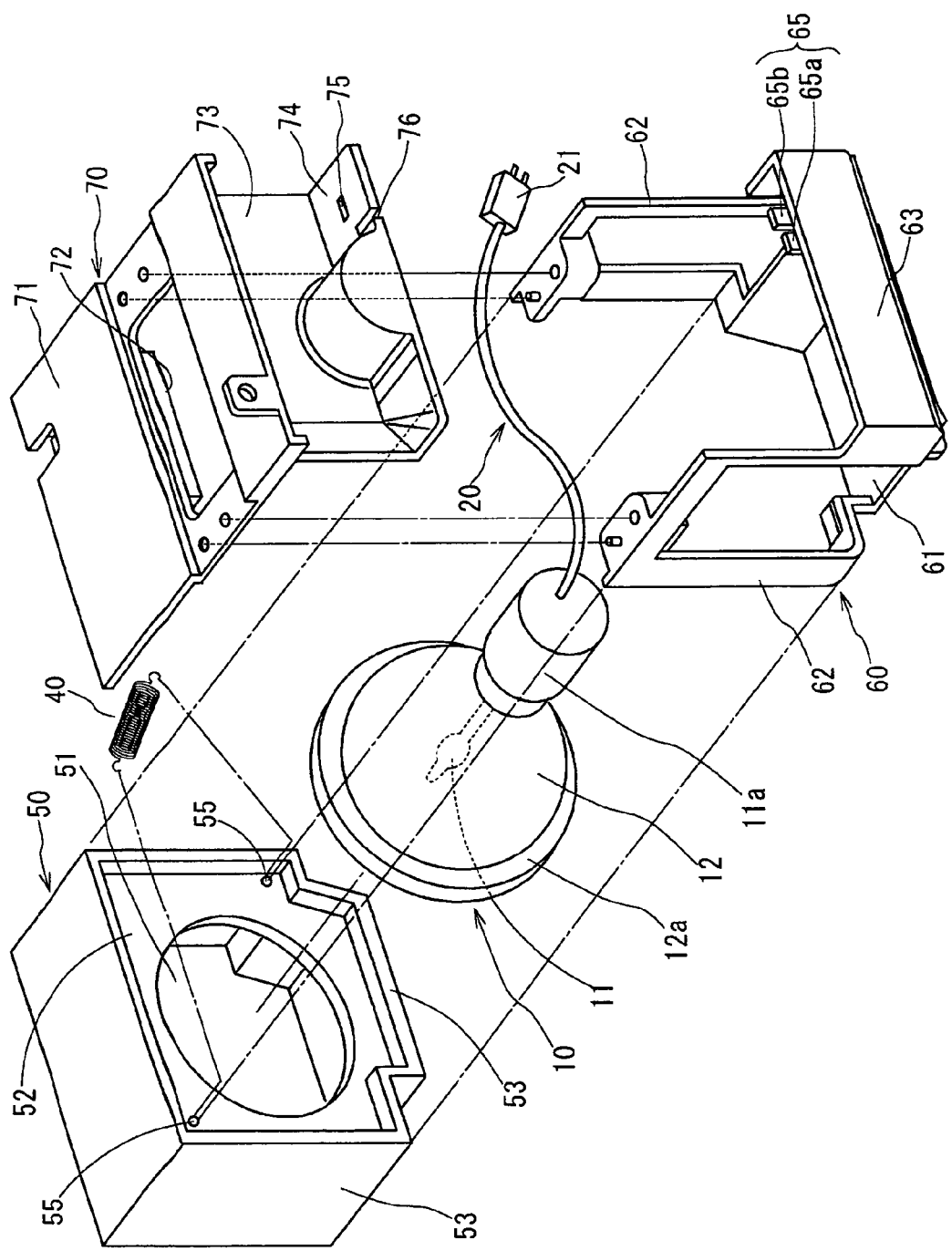
FIG. 3 is a schematic exploded perspective view of the lamp unit.

In the following, the lamp unit 3 will be described. Referring to FIG. 2 and FIG. 3, the lamp unit 3 comprises: a lamp body 10; a cable 20 to supply electric power to the lamp body 10; a lamp box 30 to contain the lamp body 10; and a coil spring 40 to hold the lamp body 10 inside the lamp box 30.

The lamp body 10 comprises: a lamp bulb 11 to be supplied with electric power for emitting light; and a reflector 12 to reflect and collect the light emitted from the lamp bulb 11. The reflector 12 has an inner surface with a shape of concave surface that is open to the light emitting side, and also has a circumferential flange 12a provided at an end surface thereof at the light emitting side. This reflector 12 is made of glass from the viewpoint of heat resistance and efficiency of reflection. The lamp bulb 11 is fixed integrally to the reflector 12 in a manner that the light emitting portion of the lamp bulb 11 is positioned at approximately the center of the reflector 12. The lamp bulb 11, furthermore, is connected to the cable 20 at an electrical connection portion 11a positioned behind the reflector 12. The cable 20 has, at an end thereof, a connector 21 to be connected to the connector 6 of the projector body 1.

The lamp box 30 comprises a front case 50, a rear case 60 and an upper case 70 that are connected to each other. The front case 50 covers the front face of the lamp body 10, and comprises: a front wall 52 having a light emitting window for emitting the light from the lamp body 10; and a side wall 53 formed at the periphery of the front wall 52. The light emitting window 51 is formed to be a circle having a diameter slightly smaller than the diameter of the circumferential flange 12a. At two locations across the light emitting window 51, the front wall 52 has hook openings 55 to hook both ends of the coil spring 40, respectively. The side wall 53 extends beyond the front wall 52 toward the lamp body 12 by the amount of the thickness of the circumferential flange 12a.

Figure 4:
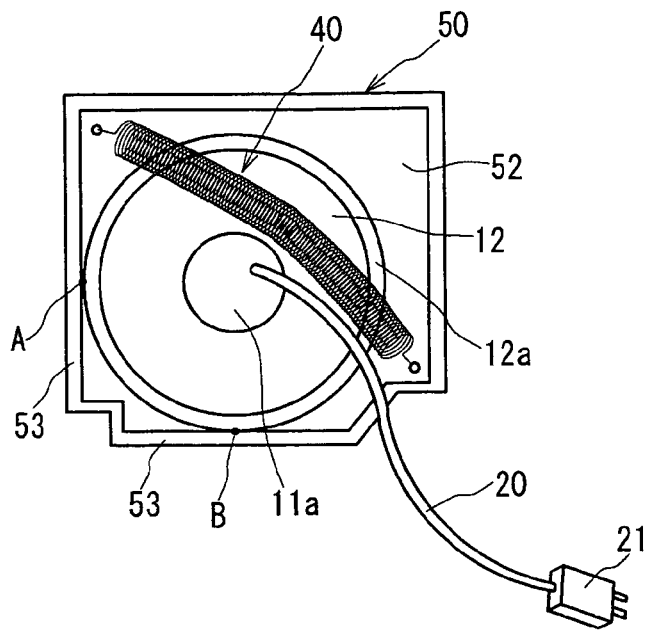
FIG. 4 is a schematic rear view of the lamp unit, showing a state where a lamp body is fixed to a front case of the lamp unit.

As shown in FIG. 4, the lamp body 10 is held and fixed in the lamp box 30 in a manner as follows. The circumferential flange 12a is contacted, at a front surface thereof, to the front wall 52, and is also contacted, at a side surface (two locations A and B) thereof, to the side wall 53. The coil spring 40 is hooked to the hook openings 55 so as to be bridged on a rear surface of the reflector 12. Thereby, the lamp body 10 is held by and fixed to the front case 50 in a manner that the circumferential flange 12a is pressed, at the front surface thereof, to the front wall 52 by the elastic force of the coil spring 40, and is also pressed, at the outer side surface thereof, to the side wall 53. The lamp body 10 can be attached to and detached from the front case 50 by hooking and releasing the coil spring 40 to and from the coil spring 40. Each of the front wall 52 and the side wall 53 of the front case 50 functions as an engagement portion for positioning and fixing the lamp body 10. In other words, the lamp body 10 is held in the lamp box 30 by the coil spring 40 hooked at both ends thereof to the lamp box 30 and by the engagement portion, provided in the lamp box 30, for positioning and fixing the lamp body 10, in a manner that the lamp body 10 is attachable to and detachable from the lamp box 30. The light emitted from the lamp bulb 11 is reflected by the reflector 12, and is emitted from the lamp box 30 through the light emitting window 51.

The rear case 60 covers the rear face and the bottom face of the lamp body 10, and comprises: a bottom plate 61; a side plate 62 and a rear plate 63 that are coupled to the bottom plate 61; and a cable fixing portion 65 placed to stand on the bottom plate 61. The cable fixing portion 65 fixes the cable 20, and is provided in the space beside the electrical connection portion 11a behind the reflector 11 of the lamp body 10. This cable fixing portion 65 comprises two posts 65a and 65b that are placed to stand approximately vertically on the bottom plate, and are spaced with a small distance slightly smaller than the thickness of the cable 20. The upper end of the post 65a is positioned at a height approximately the same as that of an upper edge of the rear plate 63, while the upper end of the post 65b is positioned at a height above that of the upper edge of the rear plate 63.

Figure 5:
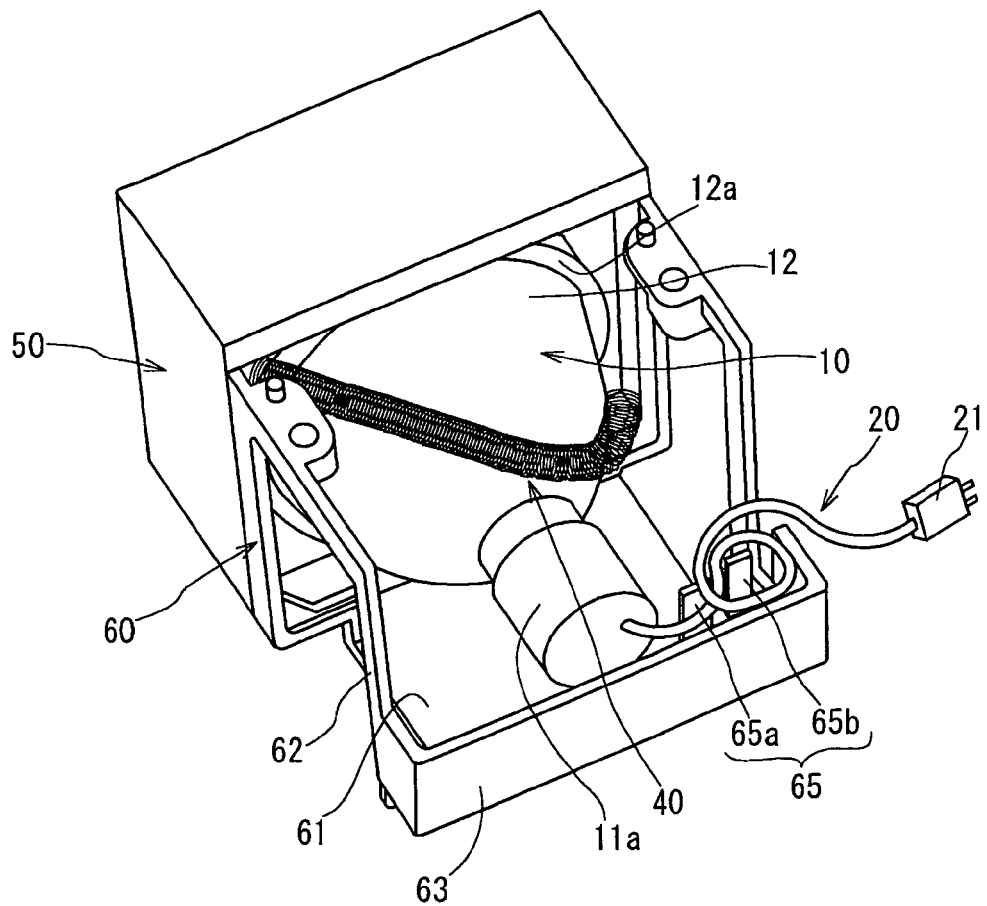
FIG. 5 is a schematic perspective view of the lamp unit, showing a state where a cable is fixed to a cable fixing unit.

As shown in FIG. 5, the rear case 60 is connected to the front case 50, with the lamp body 10 being fixed to the front case 50. At this state, the cable 20 is inserted into the space between the post 65a and the post 65b of the cable fixing portion 65, and is wound around the post 65a and the post 65b for fixing. Each of this insertion and winding around of the cable 20 in the cable fixing portion 65 is done once, twice or more than twice. The cable 20 is thus prevented from moving even when the connector 21 at the end of the cable 20 is pulled, since the cable 20 is inserted into the space between the posts 65a and 65b, which is smaller than the thickness of the cable 20, and is further wound around the posts 65a and 65b. Accordingly, even when the connector 21 at the end of the cable 20 is pulled, the pulling force is not transferred to the lamp body 10, so that the lamp body 10 is prevented from slipping in position.

The upper case 70 covers the upper face and the rear face of the lamp body 10, and comprises: a top plate 71; a rib 72 provided on and protruding from a lower surface of the top plate 71; a rear plate 73 coupled to the top plate 71; and a cover plate (cover member) 74 coupled to the rear plate 73. The rib 72 prevents the lamp body 10 from falling off the front case 50. The cover plate 74 prevents the cable 20 from slipping off the cable fixing portion 65, and also prevents the lamp body 10 from slipping in position. The cover plate 74 comprises: a connection opening 75 to connect an upper end of the post 65b of the cable fixing portion 65; and a cable insertion opening 76 to pass and draw the cable 20 out of the lamp box 30.

Figure 6:
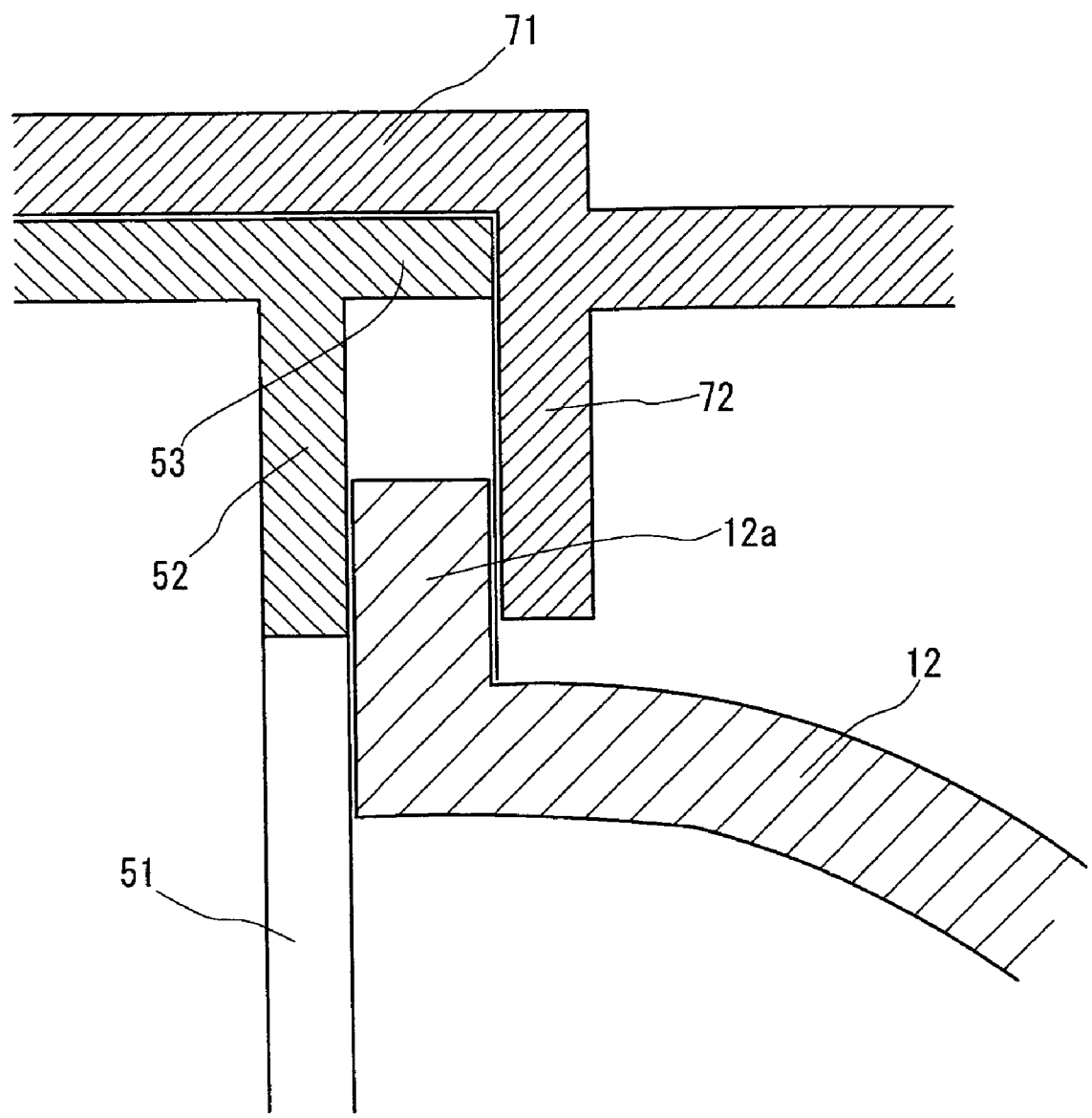
FIG. 6 is a schematic cross-sectional view of a portion of the lamp unit, showing a state where the lamp body is held by the front case and an upper case of the lamp unit.

The upper case 70 is connected to the front case 50 and the rear case 60, with the lamp body 10 being fixed to the front case 50, and with the rear case 60 being connected to the front case 50. As shown in FIG. 6, the rib 72 and the front wall 52 of the front case 50 sandwich and hold the circumferential flange 12a of the reflector 12 therebetween, with the upper case 70 being connected to the front case 50 and the rear case 60. Since the circumferential flange 12a of the reflector 12 is thus sandwiched and held, the lamp body 10 is prevented from unexpectedly falling off the front case 50.

As shown in FIG. 2, the cover plate 74 is contacted to the upper edge of the rear plate 63 of the rear case 60, and covers and closes the space around the electrical connection portion 11a of the lamp body 10 and above the cable fixing portion 65, with the upper case 70 being connected to the front case 50 and the rear case 60. At this time, the connection opening 75 of the cover plate 74 is connected to the upper end of the post 65b of the cable fixing portion 65, while the inner surface of the cover plate 74 is contacted to the upper end of the post 65a. The cable 20 is drawn through the cable insertion opening 76 of the cover plate 74. The cable 20 fixed at the cable fixing portion 65 does not slip off the posts 65a and 65b, since the cover plate 74 covers the upper side of the posts 65a and 65b in a manner that the cover plate 74 is connected to the upper end of the post 65b and is contacted to the upper end of the post 65a. In other words, the cover member is attachable to and detachable from the lamp box, and is contacted to an upper end of each of the posts 65a and 65b for preventing the cable 20 from slipping off. Furthermore, since the cover plate 74 covers the space around the electrical connection portion 11a, the lamp body 10 is prevented from slipping in position, which may otherwise occur by allowing a human hand or finger to touch the electrical connection portion 11a.

According to the lamp unit 3 having such structure as described above, the cable 20 is inserted between the two posts 65a and 65b of the cable fixing portion 65, and is wound around the two posits 65a and 65b. Thereby, the cable 20 is fixed and does not move, even when the connector 21 at the end of the cable 20 is pulled. Thus, even if the connector 21 at the end of the cable 20 is pulled at the time of e.g. mounting the lamp unit 3 in the projector body 1, the pulling force is not transferred to the lamp body 10 via the cable 20, thereby preventing the lamp body 10 from slipping in position. In addition, the cover plate 74 of the upper case 70 is mounted to contact the upper ends of the posts 65a and 65b of the cable fixing portion 65. Accordingly, even if the connector 21 at the end of the cable 20 is pulled, the cable 20 does not slip off the posts 65a and 65b, thereby fixing the cable 20 even more firmly.

It is to be noted here that the present invention is not limited to such specific embodiments as described above, and various modifications are possible. For example, the cable fixing portion 65 according to the above embodiment is not necessarily provided on the bottom plate 61 of the rear case 60, but can be provided on the rear plate 63 of the rear case 60, the top plate 71 or the rear plate 73 of the upper case 70, or the like. Furthermore, the posts 65a and 65b of the cable fixing portion 65 are not necessarily provided to be in vertical, but can be in horizontal or tilt. In addition, the cable fixing portion 65 is not necessarily structured by two posts 65a and 65b, but can be structured by three or more posts.

Furthermore, the posts 65a and 65b according to the above embodiments can have the same height. In such case, the upper ends of both posts 65a and 65b can be either connected to the cover plate 74, or contacted to the inner surface of the cover plate 74 without being connected to the cover plate 74. Moreover, it is not always necessary to connect or contact the upper ends of the posts 65a and 65b to the cover plate 74. More specifically, it is possible to provide some small space between the cover plate 74 and the upper ends of the posts 65a and 65b to the extent that the cable 20 does not slip off the cable fixing portion 65. By these modified embodiments as well, the cable 20 can be prevented from slipping off the cable fixing portion 65 similarly as in the above-described embodiments. In addition, the cable insertion opening 76 is not necessarily provided in the cover plate 74 of the upper case 70, but can be provided in the top plate 71 or the rear plate 73 of the upper case 70, the bottom plate 61 or the rear plate 63 of the rear case 60, or the like.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A lamp unit for an image projector having a projector body provided with a connector, the lamp unit comprising:
   a lamp body comprising a lamp bulb and a reflector;
   a lamp box being provided to hold the lamp body; and
   a cable extending outside of the lamp box, comprising a connector at an end thereof, for supplying electric power to the lamp body,
   wherein the lamp body receives electric power from the projector body by connecting the connector of the cable to the connector of the projector body, and
   wherein the lamp box comprises two posts placed therein with a small space therebetween, and the cable is fixed by being inserted into the space between the two posts and by being wound around the two posts.

2. The lamp unit for an image projector according to claim 1, which further comprises a cover member being attachable to and detachable from the lamp box, and being contacted to an upper end of each of the posts for preventing the cable from slipping off.

3. The lamp unit for an image projector according to claim 2, wherein the cover member comprises a cable insertion opening to pass and draw the cable to outside the lamp box.

4. A lamp unit for an image projector having a projector body provided with a connector, the lamp unit comprising:
- a lamp body comprising a lamp bulb and a reflector;
- a lamp box being provided to hold the lamp body; and
- a cable, comprising a connector at an end thereof, for supplying electric power to the lamp body,
- wherein the lamp body receives electric power from the projector body by connecting the connector of the cable to the connector of the projector body, and
- wherein the lamp box comprises two posts placed therein with a small space therebetween, and the cable is fixed by being inserted into the space between the two posts and by being wound around the two posts;
- wherein the lamp body is held in the lamp box by a coil spring hooked at both ends thereof to the lamp box and by an engagement portion, provided in the lamp box, for positioning and fixing the lamp body, in a manner that the lamp body is attachable to and detachable from the lamp box.

5. The lamp unit for an image projector according to claim 4, which further comprises a cover member being attachable to and detachable from the lamp box, and being contacted to an upper end of each of the posts for preventing the cable from slipping off.

6. The lamp unit for an image projector according to claim 5, wherein the cover member comprises a cable insertion opening to pass and draw the cable to outside the lamp box.

7. A lamp unit for an image projector having a projector body provided with a connector, the lamp unit comprising:
- a lamp body comprising a lamp bulb and a reflector;
- a lamp box being provided to hold the lamp body; and
- a cable extending outside of the lamp box, comprising a connector at an end thereof, for supplying electric power to the lamp body,
- wherein the lamp, body receives electric power from the projector body by connecting the connector of the cable to the connector of the projector body, and
- wherein the lamp box comprises two posts placed therein with a small space therebetween sized to be smaller than a cross-section of the cable, and the cable is fixed by being frictionally inserted into the space between the two posts and by being wound around the two posts.

* * * * *